United States Patent [19]

Okuda et al.

[11] 4,147,970

[45] Apr. 3, 1979

[54] DIRECT CURRENT POWER SUPPLY DEVICE FOR BATTERY CHARGING

[75] Inventors: Yukio Okuda; Naohiro Katayama, both of Tokyo, Japan

[73] Assignee: Sawafuji Electric Co. Ltd., Tokyo, Japan

[21] Appl. No.: 752,287

[22] Filed: Dec. 20, 1976

[30] Foreign Application Priority Data

Dec. 25, 1975 [JP] Japan .................. 50-155536
May 21, 1976 [JP] Japan .................. 51-57921
May 21, 1976 [JP] Japan .................. 51-57922

[51] Int. Cl.² .................................. H02J 7/04
[52] U.S. Cl. ........................ 320/21; 320/32; 320/39
[58] Field of Search .............. 320/21, 23, 32, 39, 320/40, 59

[56] References Cited

U.S. PATENT DOCUMENTS

| | | | |
|---|---|---|---|
| 3,736,490 | 5/1973 | Fallon et al. | 320/59 X |
| 3,758,839 | 9/1973 | Medlar | 320/32 |
| 4,019,111 | 4/1977 | Bennefeld | 320/32 X |
| 4,031,451 | 6/1977 | Gordon | 320/39 X |

Primary Examiner—Robert J. Hickey

[57] ABSTRACT

A direct current power supply device for rectifying an a-c voltage of external power supply and supplying d-c power to a battery and/or a d-c load characterized in that it comprises a current detector to detect a current component flowing to the battery, a voltage detector to detect a terminal voltage of the battery, a control circuit controlled by the current detector and the voltage detector, a leakage transformer functioning by external a-c power supply, and a charging converter circuit for supplying d-c power to the battery, the charging converter circuit being controlled by the control circuit and supplied power from the output of the leakage transformer, the control circuit comprising a maximum value detecting circuit to combine output voltage of the circuit detector and the voltage detector, a switching circuit controlled by the maximum value detecting circuit, a pulse generating circuit in which pulse rise time controlled by the switching circuit and a switching control circuit controlled by the pulse generating circuit, whereby the direct current power supply device is provided a predetermined current-voltage characteristic.

14 Claims, 13 Drawing Figures

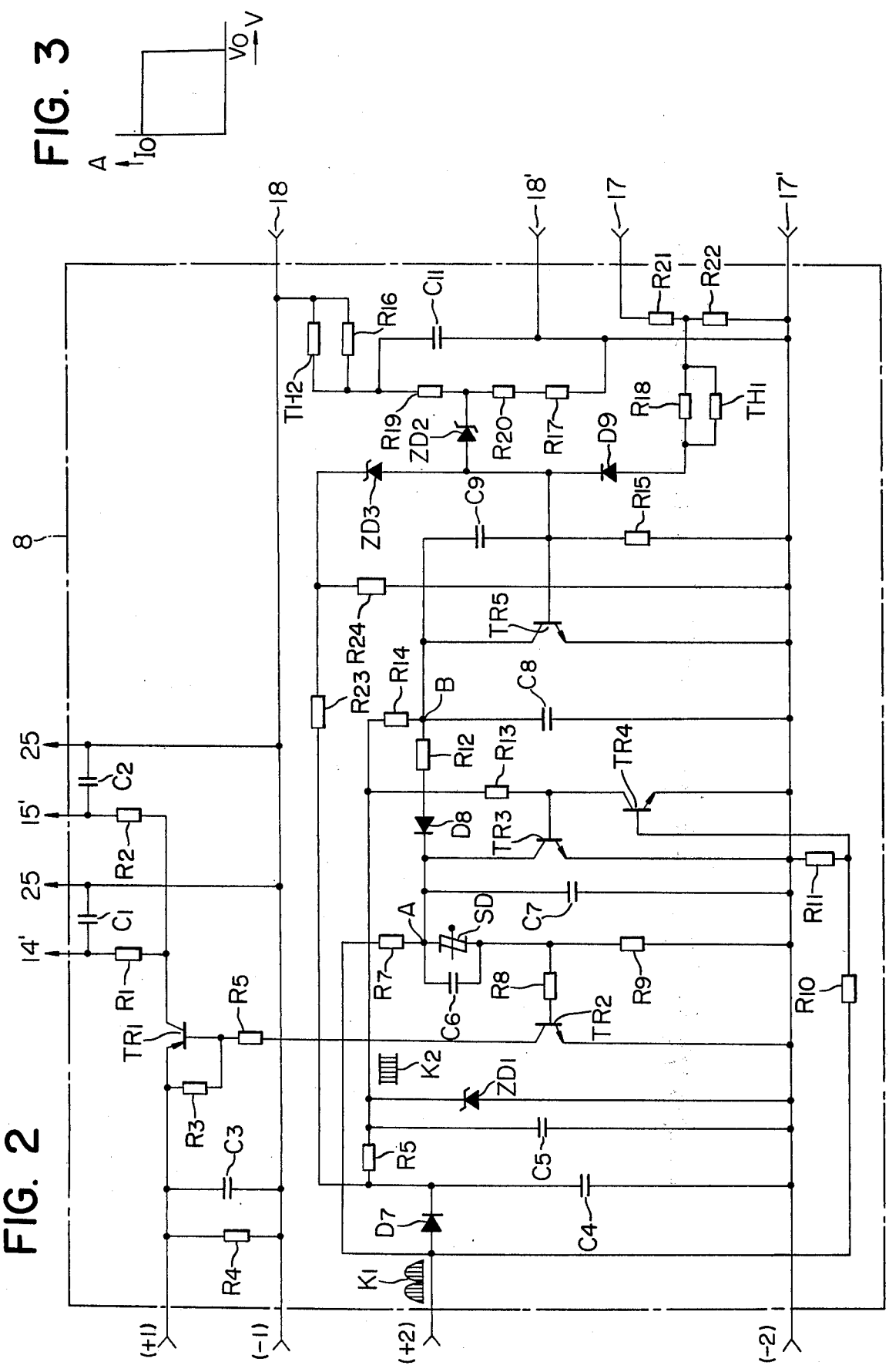

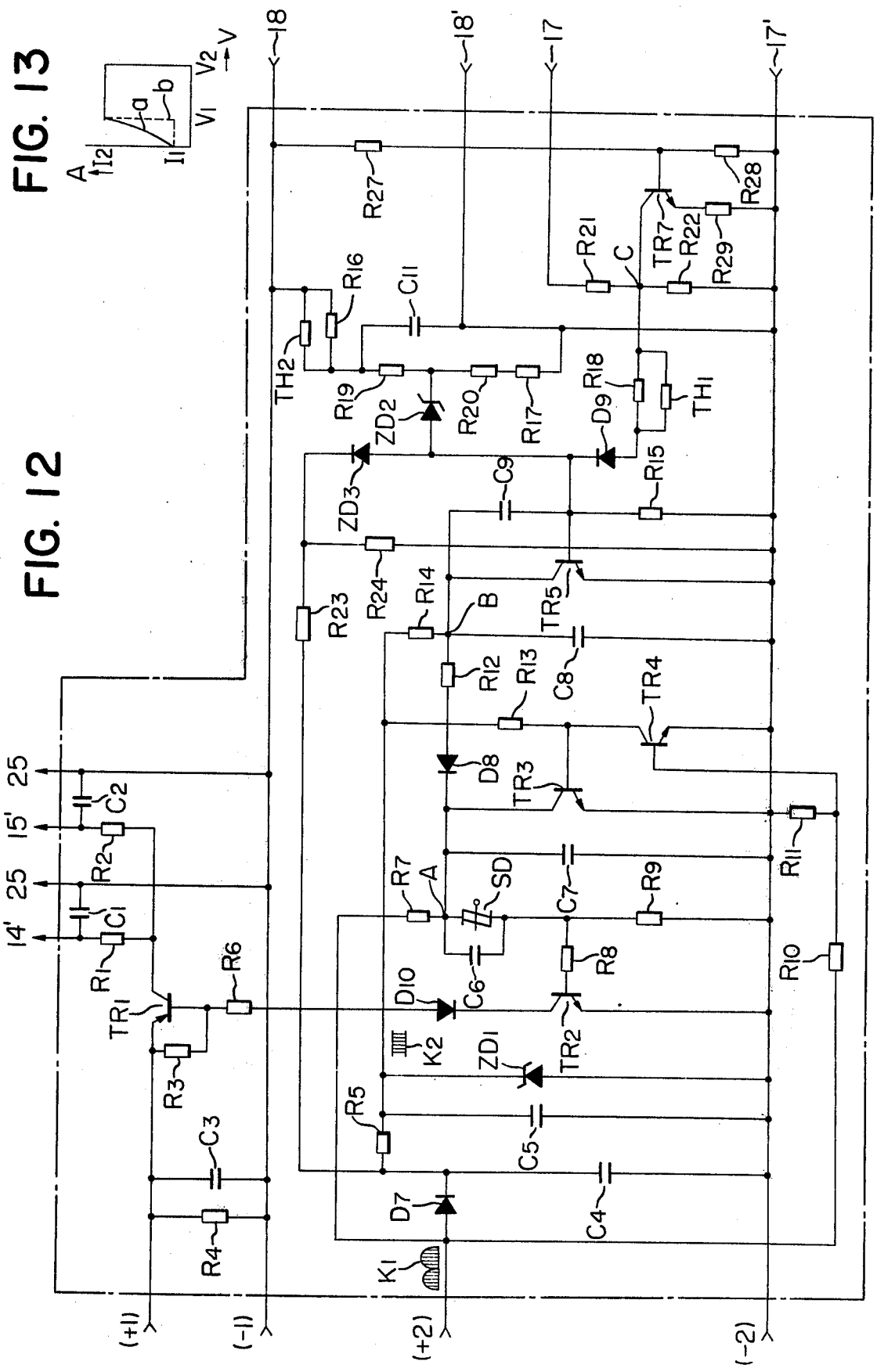

DIRECT CURRENT POWER SUPPLY DEVICE FOR BATTERY CHARGING

BACKGROUND OF THE INVENTION

1. Field of the Invention

This invention relates generally to a direct current power supply device, and, more particularly to a direct current power supply device for rectifying the output voltage of an external a-c power supply such as an engine generator to supply power to a d-c load and/or a battery, wherein control is exerted to give a predetermined current-voltage characteristic, and a leakage transformer is used.

2. Description of the Prior Art

A recreational vehicle such as a mobile home usually has a d-c power supply device which supplies power from a battery to a d-c load during running, and supplies power to the d-c load/and/or the battery via a converter when an external a-c power supply or an engine generator is available.

In charging the battery, the d-c power supply device is generally designed to provide a constant current-constant voltage characteristic to the converter. The d-c power supply device of this type is subject to relatively large voltage fluctuations due to the source voltage fluctuations in an engine generator which is used as an a-c power supply. Even when an external a-c power supply is used, voltage fluctuations become extremely large if an a-c load such as an air conditioner having a relatively large capacity is turned on and off from time to time. In addition, the temperature in this type of d-c power supply device tends to rise due to the above-mentioned voltage increase.

Taking into consideration the above-mentioned voltage fluctuations and temperature rise, the conventional d-c power supply device usually uses circuit elements having a relatively large capacity, which causes cost to rise and the size of the device to increase.

Furthermore, in the conventional d-c power supply device, it is difficult to obtain desired constant current-constant voltage characteristic due to the above-mentioned voltage fluctuations and/or temperature rise.

In addition, when a battery with an extremely low terminal voltage is charged in this type of d-c power supply device, an excess current is produced, damaging the battery and circuit elements, particularly semiconductor elements. For this reason, it is desired to protect circuit elements against excess current.

SUMMARY OF THE INVENTION

An object of the present invention is to provide a d-c power supply device which overcomes the above-mentioned problems.

Another object of this invention is to provide a d-c power supply device which causes voltage fluctuations on the input side of the converter to be fully absorbed and transmitted to the output side of the converter by providing a leakage transformer in the above-mentioned converter.

A further object of the present invention is to provide a d-c power supply device which detects an unwanted increased voltage produced on the output side of the converter to prevent a transformer and thyristors from being unwanted heated by providing an excess input voltage detecting means in the control circuit.

A still further object of the present invention is to provide a d-c power supply device which is capable of obtaining desired constant current-constant voltage characteristics by providing a compensating means with ambient temperature.

A still further object of this invention is to provide a d-c power supply device which can be made inexpensive with circuit elements of small capacity by providing a leakage transformer in the converter and a compensating means with ambient temperature.

A further object of this invention is to provide a d-c power supply device which is designed to protect a battery and circuit elements against excess current produced when the battery terminal voltage is extremely small.

BRIEF DESCRIPTION OF THE DRAWINGS

FIG. 2 is a circuit diagram illustrating an example of the control circuit as shown in FIGS. 1, 6, 7, 8 and 10, and FIG. 3 shows the control characteristics thereof. FIG. 12 is a circuit diagram illustrating another example of the control circuit as shown in FIGS. 1, 6, 7, 8 and 10, FIG. 13 is a diagram illustrating the control characteristics thereof.

DETAILED DESCRIPTION OF PREFERRED EMBODIMENTS

Figure 1:
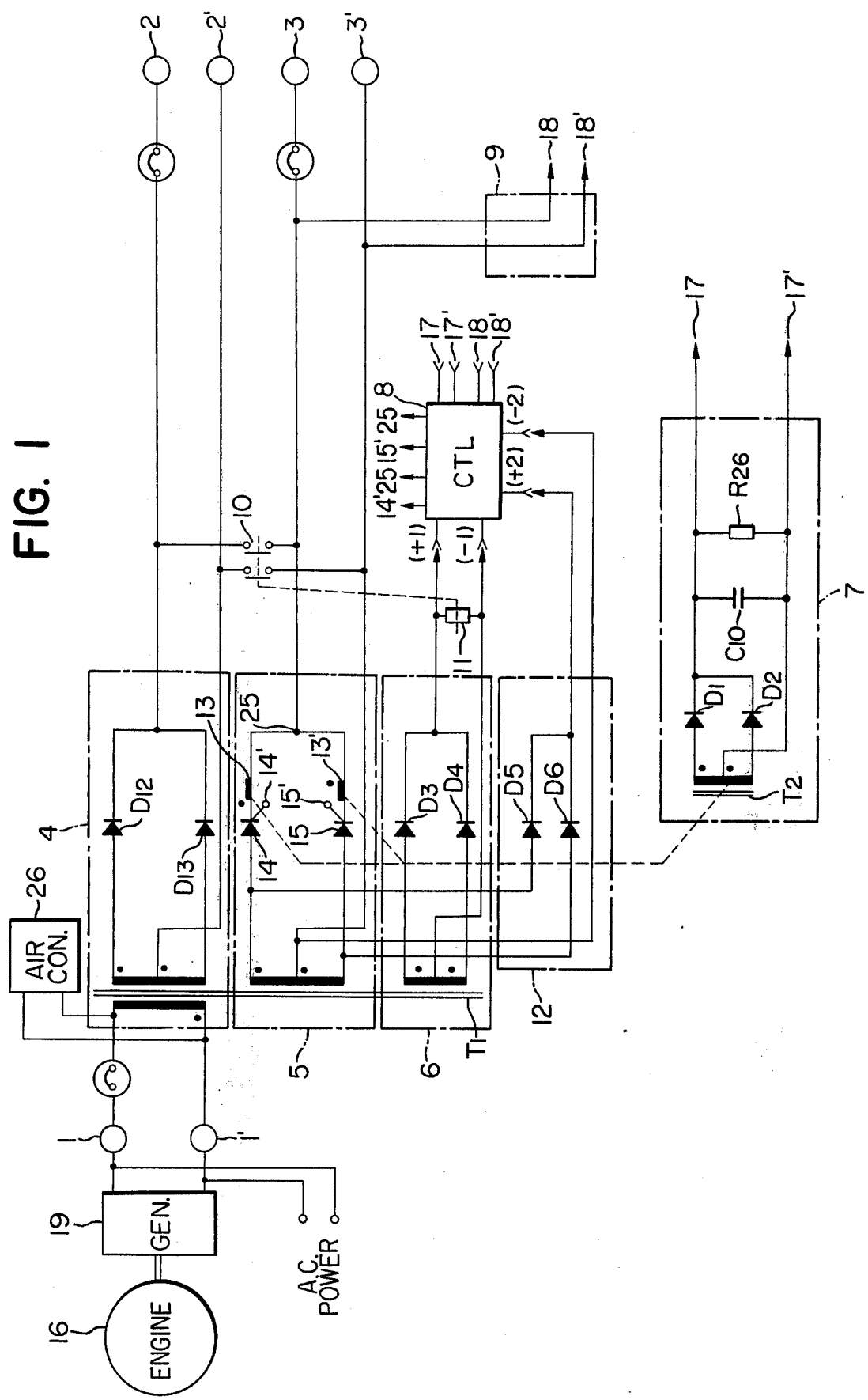
FIG. 1 is a circuit diagram of a d-c power supply device embodying this invention.

In FIG. 1, T1 refers to a leakage transformer, T2 to a current transformer. Numerals 1 and 1' refer to the input terminals of an external a-c power supply, 2 and 2' to d-c load terminals, 3 and 3' are battery terminals, 4 to a converter circuit for load which rectifies alternating current supplied by an external power source to directly feed to the load, 5 to a battery charging converter circuit having thyristors 14 and 15. Numeral 6 refers to a gate circuit power supply, 7 to a current detecting circuit, 8 to a control circuit, 9 to a voltage detecting circuit, 10 to an automatic switching contact between the external power source and the battery power supply, 11 to a relay winding, 12 to a power supply for the control circuit, 16 to an engine, 19 to an a-c generator, and 26 to an a-c equipment such as an air conditioner.

In FIG. 1, an automatic switching contact 10 is a normally closed contact, which feeds power from battery terminals 3, 3' to a d-c load via the automatic switching contact 10 when power is required to be fed to the load at locations where an external a-c power is not available. The above-mentioned battery may be regarded as a battery provided separately from a battery to be used during starting of a vehicle, for example, an automobile. On the other hand, where an a-c power is available, application of an a-c voltage to the terminals 1 and 1' energizes the relay winding 11, causing the automatic switching contact 10 to open. This interrupts power supply from the battery to the load, initiating power supply from the converter circuit 4 to the load. At the same time, the battery is charged by the battery charging converter circuit 5. The battery charging converter circuit 5 comprises the thyristors 14 and 15, which are controlled by signals from the control circuit 8, as described later. In other words, the charging current flowing from the battery charging converter circuit 5 to the battery is detected by the current detecting circuit 7, and the terminal voltage of the battery is detected by the voltage detecting circuit 9. The thyristors 14 and 15 are controlled by either of current or voltage, providing a required constant current constant voltage characteristic.

The primary windings 13 and 13' of the current transformer T2 are connected to the battery charging converter circuit 5. The output of the secondary winding, which is full-wave rectified by diodes D1 and D2, appears on the terminals 17 and 17', and is led to the control circuit 8. The voltage detecting circuit 9 is designed to introduce the voltage across the battery terminals 3 and 3' to the terminals 18 and 18', the voltage being further led to the control circuit 8. Meanwhile, a d-c voltage (+2), (−2) is impressed from the power supply 12 to the control circuit 8 to be used as a power source for the control circuit 8. A d-c voltage (+1), (−1) is applied from the gate circuit power supply 6 to the control circuit 8 to be used as a power source for controlling the gates of the thyristors 14 and 15.

FIG. 2 shows an embodiment of control circuit 8 shown in FIG. 1, a current signal from above-mentioned current detecting circuit 7 is applied to terminals 17 and 17' and voltage signal from above-mentioned voltage detecting circuit 9 is applied to the terminals 18 and 18'. And the terminals (+1), (−1) and (+2), (−2) are applied voltages from previous power supply 6 and 12.

FIG. 3 shows a control characteristic obtained by the control circuit 8 shown in FIG. 2, the control circuit 8 controls the thyristors 14 and 15 shown in FIG. 1 so as to keep a charging current against the battery in a state of constant current until the battery terminal voltage V reaches a desired level $V_O$ (FIG. 3), and further controls the thyristors 14 and 15 so as to keep the battery terminal voltage in a specified level when the battery terminal voltage V reaches the desired level $V_O$. Application of the constant current and constant voltage characteristic enables a constant voltage control in which an excessive current does not flow at initial period of charging a battery and an excessive charging state may not be obtained at the end of charging period.

In FIG. 2, $R_{21}$, $R_{22}$, $R_{18}$, $D_9$, $R_{16}$, $R_{19}$, $R_{20}$, $R_{17}$, $ZD_2$, $R_{15}$ are a maximum value detecting circuit, $C_7$, SD, $R_9$, $TR_3$ and $TR_4$ are a pulse generating circuit, $TR_2$ and $TR_1$ are a switching control circuit and $TR_5$ is a switching circuit.

In FIG. 2, current signal applied to the terminals 17 and 17' is divided to a voltage by resistors $R_{21}$ and $R_{22}$, and is applied to a base of transistor $TR_5$ via resistor $R_{18}$, thermister TH1 and diode $D_9$. On the other hand, voltage signal applied to the terminals 18 and 18' is divided to a voltage by resistors $R_{16}$ and $R_{19}$, thermistor $TH_2$ and resistors $R_{20}$ and $R_{17}$ and is applied to a base of transistor $TR_5$ via Zener diode $ZD_2$. Thus the diode $D_9$ and Zener diode $ZD_2$ form a maximum value detecting circuit against the base of the transistor $TR_5$. That is, during a terminal voltage at terminals 3, 3' (18, 18') of the battery is in the low level, it enables an effective control by current signal and when the terminal voltage is over a predetermined voltage level $V_O$ it enables an effective control by the voltage signal.

A control over the thyristors 14 and 15 shown in FIG. 1 is described hereunder and a control over the thyristors 14 and 15 accompanied by an off-on of the transistor $TR_5$ shown in FIG. 2 is described hereunder. When the transistor $TR_5$ is in off state, a d-c voltage (shown at $K_1$) of full-wave rectifying waveform applied to the terminals (+2) and (−2) is changed to a constant voltage state by the resistor $R_5$, condenser $C_5$ and Zener diode $ZD_1$ via diode $D_7$. And the constant voltage (shown at $K_2$) charges a condenser $C_7$ via resistor $R_{14}$ and $R_{12}$ and diode $D_8$. When a terminal voltage at condenser $C_7$ reaches a predetermined voltage or a switching voltage of a switching diode SD, the switching diode SD is turned on and generates a voltage at resistor $R_9$. As a result, the transistor $TR_2$ is turned on and thereby the transistor $TR_1$ is turned on. A d-c voltage applied to the terminals (+1) and (−1) is applied to the terminals 14' and 15' via a transistor $TR_1$ and turns on the thyristors 14 and 15 shown in FIG. 1.

A full-wave rectified wave form voltage $K_1$ between the terminals (+2) and (−2) is divided by the resistor $R_{10}$ and is applied to the base of a transistor $TR_4$. Thus, each time the voltage $K_1$ reaches a substantial zero potential at half cycle, the transistor $TR_4$ is turned off, thereby the transistor $TR_3$ is turned on to discharge the electric charge of condenser $C_7$. That is, the switching diode SD is turned off to eliminate gate signal provided to the thyristors 14 and 15 shown in FIG. 1, the thyristors 14 and 15 wait until a gate signal is newly applied during next half cycle.

This results in the following items occurring. The thyristors 14 and 15 are turned on with a slight delay in phase at the initial period of each cycle at each half cycle and turned off at the end of each half cycle. And the conducting angle of the thyristors 14 and 15 are designed to be as much wider as possible. And at this time the condenser $C_7$ is charged by a constant voltage $K_2$ each time the transisotr $TR_3$ is turned off after the same is once turned on. Due to a time constant at charging, there is a time delay until a terminal voltage at condenser $C_7$ reaches a switching voltage of the switching diode SD and thus causes some limitations on a selection of wider angle of conducting of the thyristers 14 and 15 shown in FIG. 1. In order to overcome these problems, the present invention provides a d-c voltage $K_1$ of full-wave rectified waveform at the illustrated point A via resistor $R_7$. That is, a first charging circuit for charging a condenser $C_7$ from voltage $K_2$ via resisters $R_{14}$ and $R_{12}$ and a diode $D_8$ and a second charging circuit for charging from voltage $K_1$ via resistor $R_7$ are provided, and they are arranged such that the condenser $C_7$ is charged sufficiently at high speed by both charging circuits. That is, they are such that an angle of conducting of the thyristors 14 and 15 shown in FIG. 1 is made as large as possible.

As long as the above-mentioned transistor $TR_5$ is in off state, the thyristors 14 and 15 shown in FIG. 1, as described above, are made to have a sufficient large angle of conduction, but when the transistor $TR_5$ is changed to be "on" state, a potential at point B shown in FIG. 2 is lowered to a zero potential and kept at the zero potential by the transistor $TR_5$. Thus, the first charging circuit for charging the condenser $C_7$ becomes null, a terminal voltage of the condenser $C_7$ is short circuited by a transistor $TR_3$ before the switching diode SD is turned on, and the transistor $TR_2$ is not turned on. That is, the thyristors 14 and 15 shown in FIG. 1 are kept in a complete off state.

In other words, when a translstor $TR_5$ is in an off-state, the thyristors 14 and 15 shown in FIG. 1 are made to have a sufficient large angle of conduction to charge the battery, and when the transistor $TR_5$ is in an on-state, the thyristors 14 and 15 are in a complete off-state, a charging current for the battery is cut off. Thus, as apparent from reference to FIG. 3, when a voltage at battery terminals 3 and 3' shown in FIG. 1 is lower than a voltage level $V_O$, a charging current against the battery is controlled so as to keep a current level $I_O$ determined by a level of division point divided by the resistors $R_{21}$ and $R_{22}$ shown at lower right side of FIG. 2. That is, the battery charging converter circuit 5 is made to have a constant current characteristic. And when the voltage at battery terminals 3 and 3' reach a voltage level $V_O$, the voltages at the terminals 3 and 3' are controlled so as to be kept in a voltage level $V_O$ determined at a level of division point between the resistors $R_{19}$ and $R_{20}$ shown in the central right portion of FIG. 2. That is, the battery charging converter circuit 5 is made to have a constant voltage characteristic. The condenser $C_9$ forms a parallel circuit with the condenser $C_7$, so called a soft-start function, when a voltage is at first applied to the terminals (+2) and (−2).

$T_1$ shown in FIG. 1 is composed of a leakage transformer. Thus when a power supply voltage of engine generator 19 is fluctuated to cause an input voltage of the converter circuit 5, the fluctuation is absorbed by a leakage reactance of the leakage transformer $T_1$. Even when the input voltage of the leakage transformer $T_1$ is fluctuated accordingly to the on-off condition of the air conditioner 26, the fluctuation is the same as that described above. That is, an output side of the converter circuit 5 is slightly affected by the fluctuation. And the angle of conduction in a secondary winding current is widened by a linkage reactance of leakage transformer $T_1$, and a maximum current value is decreased. Thus the capacity of the circuit elements or the thyristors 14 and 15 in the control circuit 8 is relatively low and enables a life of the battery to extend. And it may be possible to have a desired constant current and constant voltage characteristic.

Resistors $R_{23}$ and $R_{24}$ and Zener diode $ZD_3$ shown in FIG. 2 are used to prevent an unwanted heating of the circuit elements such as transformer or thyristor etc. due to undesired increase in an a-c input voltage and form an excessive input voltage detecting means according to the present invention. Resistors $R_{23}$ and $R_{24}$ are connected in series, these connecting points are connected to one end of the Zener diode $ZD_3$ and the other end is connected to the base of transistor $TR_5$. And the voltage smoothed by the diode $D_7$ and the condenser $C_4$ is applied to the both ends of the series circuit consisting of resistors $R_{23}$ and $R_{24}$. The voltage applied to the terminals (+2) and (−2) is, as described above, that obtained after transformation and rectification of an a-c input voltage applied to the converter. When a voltage applied to a series circuit of resistors $R_{23}$ and $R_{24}$ is increased after the a-c input voltage increase, Zener diode $ZD_3$ is conducted. Just then, a control by a current signal supplied to the terminals 17 and 17' or a control by a voltage signal applied to the terminals 18 and 18' is made to be null, respectively. And a current flowing to the base of transistor $TR_5$ is controlled by an a-c input voltage and a collector current of transistor $TR_5$ is controlled by an a-c input voltage. As a result of conduction of Zener diode $ZD_3$, a collector current of transistor $TR_5$ is increased in response to an increase of an a-c input voltage and the increase in the collector current causes a decrease in an angle of conduction of the thyristors 14 and 15. The decrease in an angle of conduction of the thyristors 14 and 15 causes a decrease in output current (or output voltage) of the converter. Thus, when an amount of an a-c input voltage exceeds a set value, an output current (or output voltage) of the converter is decreased.

The thermistor $TH_1$ corresponds to a compensation means by an atmosphere temperature of the present invention. The thermistor $TH_1$ is of having such characteristic as that the resistor value is decreased when a temperature is increased, and forms a parallel circuit along with resistor $R_{18}$. One end of the parallel circuit comprising of the thermistor $TH_1$ and resistor $R_{18}$ is connected to a connecting point between the resistors $R_{21}$ and $R_{22}$ and the other end thereof is connected to diode $D_9$. When an atmosphere temperature is increased undesirably, the current flowing from said connecting points via said parallel circuit and diode $D_9$ is increased even if the current signal applied to the terminals 17 and 17' are the same value. This increase in current causes an increase in collector current of transistor $TR_5$ and decrease in an angle of conduction of the thyristors 14 and 15. As a result, the constant current level $I_O$ shown in FIG. 3 is decreased in its value.

The thermistor $TH_2$ also corresponds to a compensation means by atmosphere temperature according to the present invention and has such characteristic as that the resistance value decreases when a temperature is increased. The thermistor $TH_2$ is connected to resistor $R_{16}$ in parallel. When an atmosphere temperature is increased, the resistance value of the thermistor $TH_2$ is decreased and the voltage at the connecting points between the resistors $R_{19}$ and $R_{20}$ is increased even if the voltage signal applied to the terminals 18 and 18' are the same value. This increase in voltage causes an increase in conductivity of transistor $TR_5$ and a decrease in angle of conduction of the thyristors 14 and 15. As a result, a constant voltage level $V_O$ shown in FIG. 3 is decreased. In this case, it is possible to determine the way in which the constant current level $I_O$ and constant voltage level $V_O$ are changed by the temperature, by providing any suitable characteristic to the thermistor $TH_1$, thermistor $TH_2$, resistor $R_{18}$ or resistor $R_{16}$. For example, it may be possible to provide such elements as that a decrease in value of the elements is caused when an atmosphere temperature exceeds a set value or a proportional decrease in value of the elements is caused in response to the increase of an atmosphere temperature.

Figure 4:
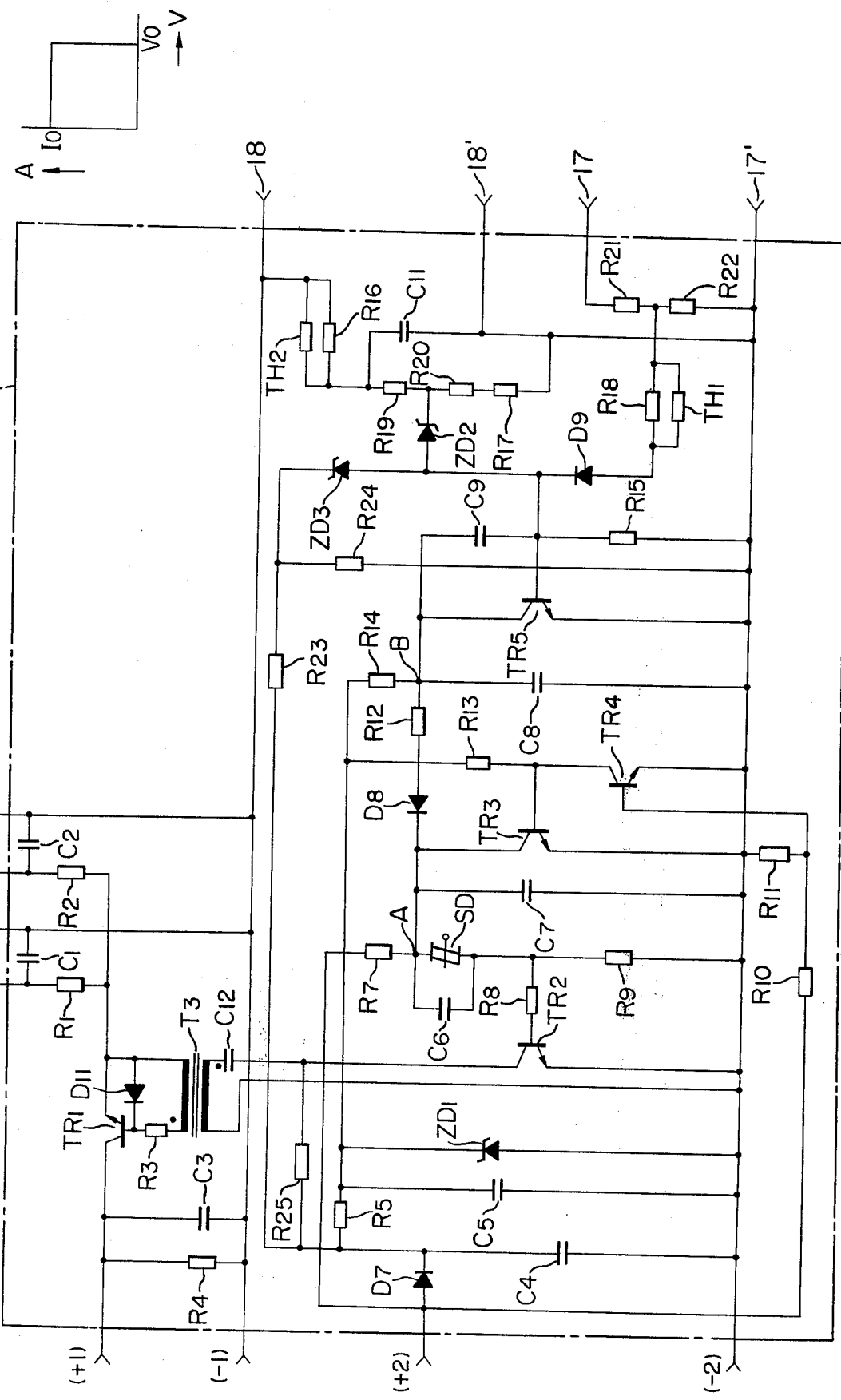
FIG. 4 is a circuit diagram showing another example of the control circuit shown in FIGS. 1, 6, 7, 8 and 10.
Figure 5:
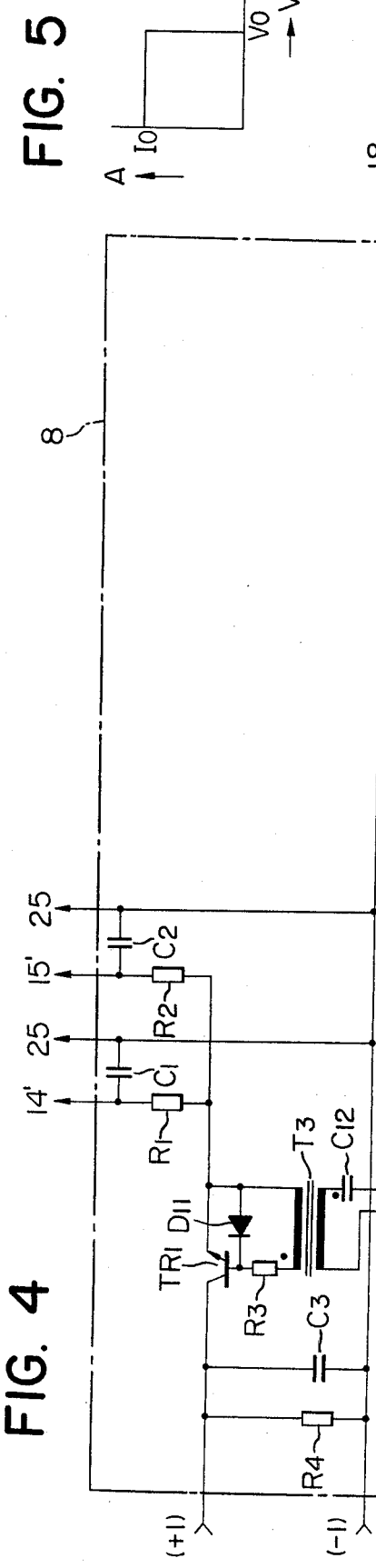
FIG. 5 is the control characteristics thereof.

FIG. 4 shows another embodiment of the control circuit 8 shown in FIG. 1, and FIG. 5 shows its characteristic in control. Reference letters shown in the drawings correspond to those shown in FIGS. 2 and 3, $T_3$ shown in a slight central left position indicates a pulse transformer.

The arrangement shown in FIG. 4 has substantially the same arrangements as that shown in FIG. 2, except that the pulse signal is applied to the transistor $TR_1$ via pulse transformer $T_3$ when the transistor $TR_2$ is turned on.

Figure 6:
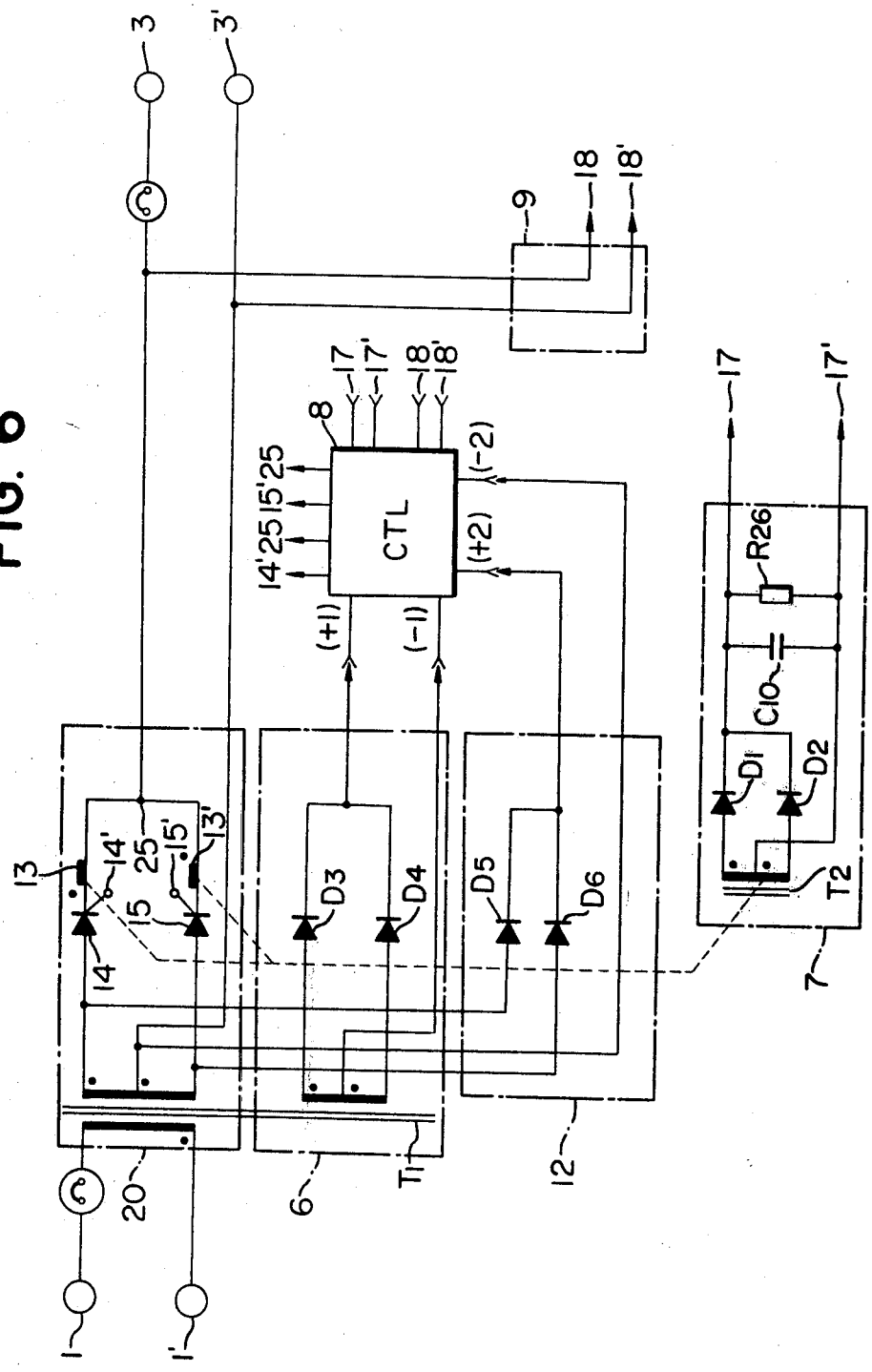
FIGS. 6, 7 and 8 are circuit diagrams illustrating another example of a d-c power supply device embodying this invention.
Figure 7:
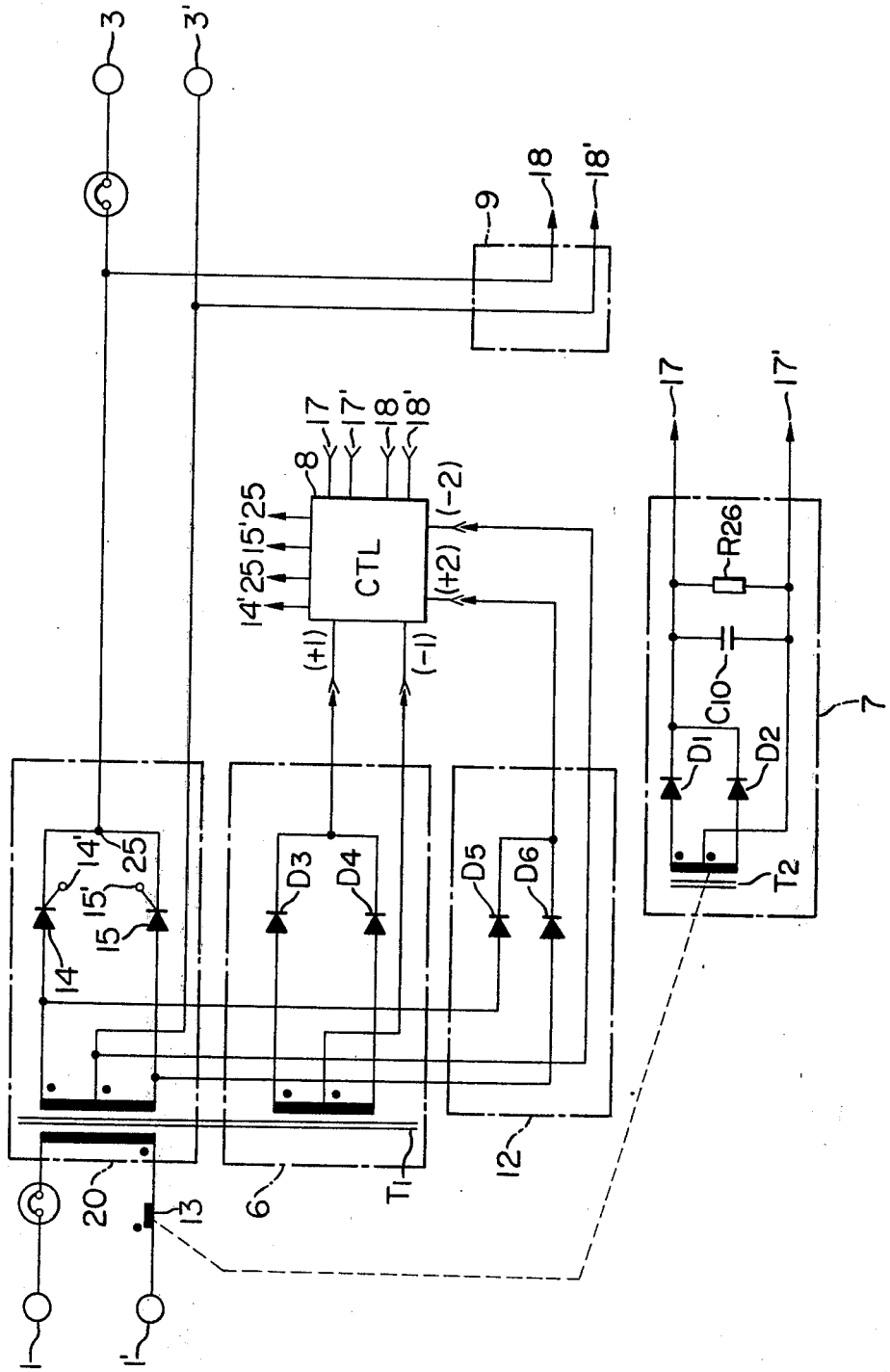

FIGS. 6 and 7 show still further embodiment of d-c power supply device of the present invention, respectively, and the reference numeral 20 shown in the drawings is a current supply converter circuit and other reference numerals correspond to that shown in FIG. 1.

In the embodiment shown in FIG. 6, a current supplying converter circuit 20 supplies the d-c power to the battery and/or the d-c load. And to the terminals 3 and 3' shown in FIG. 6 are connected together the battery and the d-c load, and the current supplying converter circuit 20 is as so-called means for charging the battery in floating manner.

Also in this case, it may become possible to provide a constant current and a constant voltage characteristics to the current supplying converter circuit 20 by making arrangements shown in FIGS. 2 or 4 as a control circuit 8 shown in FIG. 6.

Also an embodiment shown in FIG. 7 is merely different from the arrangements shown in FIG. 6 that a primary winding of current transformer T2 in the current detecting circuit 7 is connected to the input terminals 1 and 1'. And thus it is apparent that the embodiment shown in FIG. 7 may also provide a constant current and a constant voltage characteristics similar to that shown in FIG. 6 against the current supplying converter circuit 20.

Figure 8:
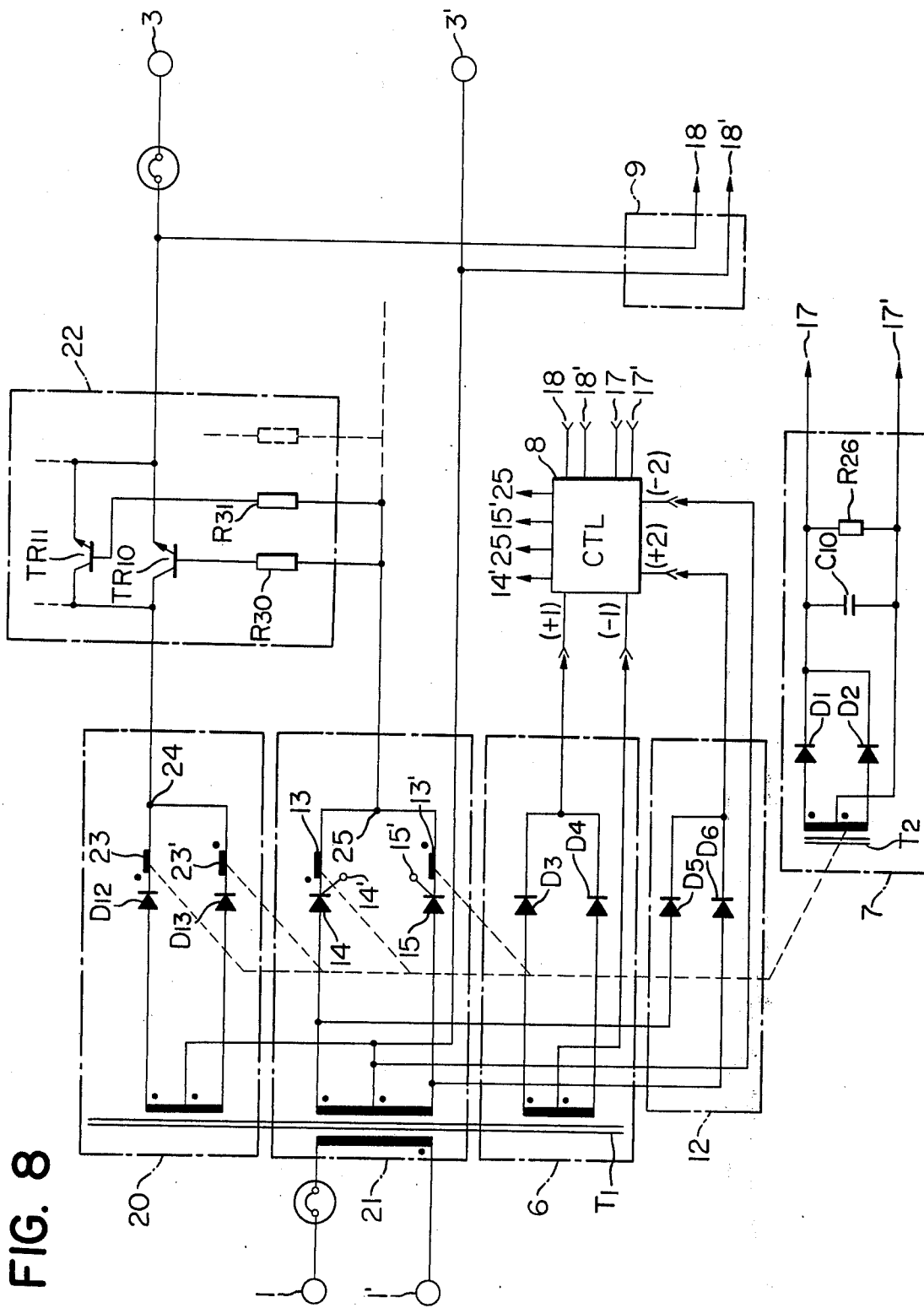

FIG. 8 shows still further embodiment of the present invention, and a control circuit 8 comprises a circuit arrangement shown in FIGS. 2 or 4.

In FIG. 8, reference numeral 21 indicates a control converter circuit of the present invention to control a control section of a charging current control circuit 22, the charging current control circuit 22 being comprised of transistors $TR_{10}$, $TR_{11}$, ... connected in parallel and ballancing base resistors $R_{30}$, $R_{31}$, ... and controlling a charging current for the battery connected to the terminals 3 and 3', and reference numerals 23 and 23' show windings forming a primary winding of current transformer T2 along with windings 13 and 13' connected to the control converter circuit 21, the remaining reference letters show corresponding reference numerals shown in FIGS. 1 to 7.

In a charging current control circuit 22 for controlling a charging current against the battery, each of the base circuit of transistors $TR_{10}$, $TR_{11}$, ... connected in parallel is connected to a terminal 25 of the control converter circuit 21 via balancing resistors $R_{30}$, $R_{31}$, ..., the base currents of the transistors $TR_{10}$, $TR_{11}$, ..., are controlled by a rectified d-c output from the control converter circuit 21. Each of the gate terminals 14' and 15' of the thyristors 14 and 15 of the control converter circuit 21 is connected a control circuit 8 having the same circuit arrangement as that shown in FIG. 2 or FIG. 4, and the thyristors 14 and 15 are operated as described above in reference to FIGS. 1 to 5. Therefore, each of the base current of the transistors $TR_{10}$, $TR_{11}$, ... is kept in a desired level $I_{BO}$ when the terminal voltage of the battery is less than a desired level (a voltage $V_O$ shown in FIG. 3), and becomes null when the terminal voltage of the battery exceeds the above-mentioned level $V_O$. Therefore, a sum of each collector current of transistors $TR_{10}$, $TR_{11}$, ... is kept in a value ($h_{FE} \cdot I_{BO}$) of the base current $I_{BO}$ multiplied by a current amplification rate $h_{FE}$, and a sum of emitter current is given by a current value of ($I_O = I_{BO} + h_{FE} \cdot I_{BO}$). That is, the battery charging current is given by the current value of ($I_{BO} + h_{FE} \cdot I_{BO}$). When the terminal voltage of the battery exceeds the voltage level $V_O$, the transistors $TR_{10}$, $TR_{11}$, ... are turned off and the battery is charged in a constant voltage state.

In FIG. 8, for example, even when an output from the current supplying converter circuit 20 includes an excessive current due to circuit troubles or other reasons, the peak value of said current is restricted by characteristics of the transistors $TR_{10}$, $TR_{11}$, ... and thus the charging current of said restricted peak value is supplied to the battery.

Thus in the embodiment of the present invention, a d-c power supply device is controlled by the transistors $TR_{10}$, $TR_{11}$, ... connected in parallel against in which a d-c power supply device of FIGS. 1, 6 and 7 controls a battery charging current by a converter 5 including the thyristors 14 and 15, and thus each of the transistors $TR_{10}$, $TR_{11}$, ... may suffice in a small capacity. And the thyristors 14 and 15 used in the control converter circuit 21 are used for controlling the base current of transistors $TR_{10}$, $TR_{11}$, ... and thus requires a small capacity compared with that of the thyristors 14 and 15 of FIGS. 1, 6 and 7.

Figure 9:
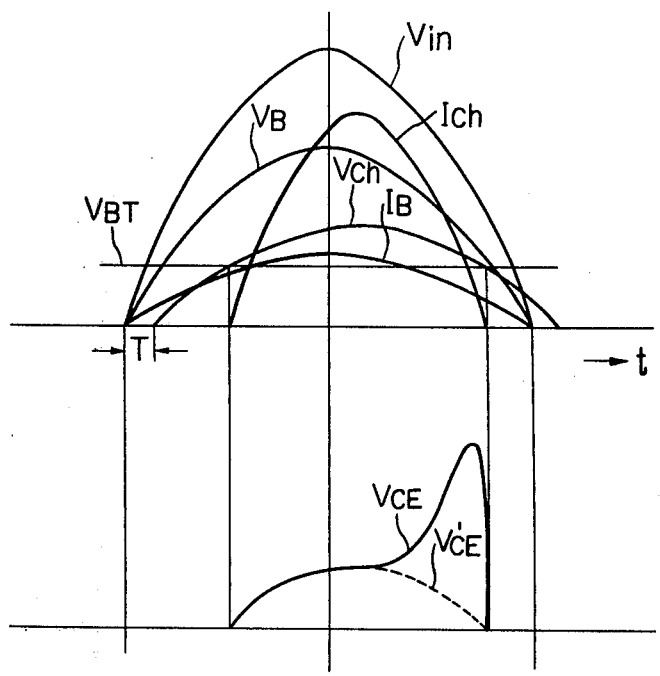
FIG. 9 is a diagram of assistance in explaining the operation of the embodiment shown in FIG. 8.

However, due to the fact that a leakage transformer $T_1$ is used, there may be a difference in phase between outputs of the current supplying converter circuit 20 or collector voltages of the transistors $TR_{10}$, $TR_{11}$, ... and output of the control converter circuit 21 or base voltages of the transistors $TR_{10}$, $TR_{11}$, ... and according to this there may be a large loss in a collector of the transistor. FIG. 9 is a schematic illustration for showing the manner in which this occurs and indicates the situation in which half wave of an a-c voltage is applied to the input terminals 1 and 1'.

In FIG. 9, $V_{in}$ is an input voltage applied to the input terminals 1 and 1', $V_{BT}$ is a voltage level of the battery, $V_B$ is an output voltage of the control converter circuit 21 or a base voltage applied to the transistors $TR_{10}$, $TR_{11}$, ..., $I_B$ is a base current flowing at the transistors $TR_{10}$, $TR_{11}$, ..., $V_{ch}$ is an output voltage of the current supplying converter circuit 20 or a collector voltage applied to the transistors $TR_{10}$, $TR_{11}$, ..., $I_{ch}$ is a collector current flowing in the transistors $TR_{10}$, $TR_{11}$, ... or a charging current of the battery, $V_{CE}$ is a collector-emitter voltage of transistors $TR_{10}$, $TR_{11}$, ..., T is a phase differential time between a base voltage $V_B$ and a collector voltage $V_{ch}$ caused in accordance with a characteristic of the leakage transformer.

As illustrated in FIG. 9, a collector current $I_{ch}$ begins to flow when a collector voltage $V_{ch}$ reaches a battery charging voltage $V_{BT}$, and does not flow when a collector voltage $V_{ch}$ is lower than the battery charging voltage $V_{BT}$. As apparent from reference to both a waveform of the collector current $I_{ch}$ and a waveform of the base current $I_B$, the base current $I_B$ intends to decrease when a collector current $I_{ch}$ is in a maximum value, and thus after that a collector-emitter voltage $V_{CE}$ intends to increase in a relatively large amount and the collector-emitter voltage $V_{CE}$ has a characteristic shown in full-line in FIG. 9. Thus a collector loss defined by a multiplication of collector current $I_{ch}$ by a collector-emitter voltage $V_{CE}$ (or $I_{ch} \times V_{CE}$) is large compared with the case in which a collector-emitter voltage is applied by a broken line waveform $V'_{CE}$ shown in FIG. 9 and thus a circuit loss is increased.

Figure 10:
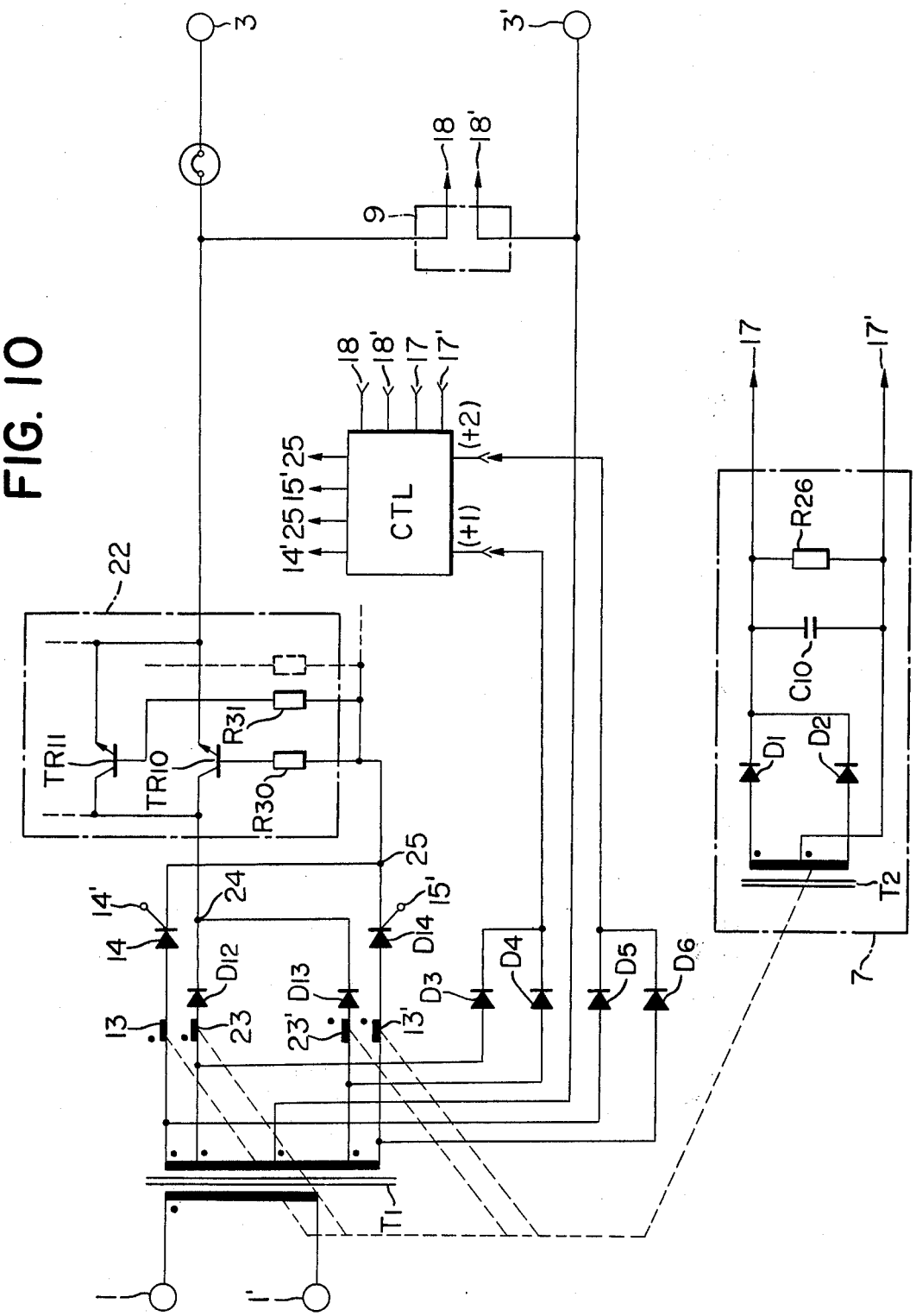
FIG. 10 is a circuit diagram illustrating another embodiment of this invention.

FIG. 10 shows one embodiment of the present invention in which this disadvantage is eliminated and the present embodiment is comprised such that the current supplying converter circuit 20 and the control converter circuit 21 are formed from the same windings to eliminate the phase differential time T. The reference letters shown in the drawings correspond to those shown in FIG. 8.

As illustrated in FIG. 10, each of the bases of the transistors $TR_{10}$, $TR_{11}$, ... is connected to the output terminal 25 of the control converter circuit 21 having the thyristors 14 and 15 via balancing resistors $R_{30}$, $R_{31}$, ... and each of the collectors is connected to an output terminal 24 of the current supplying converter circuit 20 having diodes $D_{12}$ and $D_{13}$. In the current supplying converter circuit 20, an input voltage may be obtained by providing an intermediate tap at the windings of the control converter circuit 21. Thus, the output voltage of the control converter circuit 21 and the output voltage of the current supplying converter circuit 20 have substantially the same phase. And the collector voltage of the transistors $TR_{10}$, $TR_{11}$, ... is always kept in a lower level than the base voltage, and thereby the transistors $TR_{10}$, $TR_{11}$, ... are operated in a saturated region and a voltage drop in a collector-emitter of the transistor $TR_{10}$, $TR_{11}$, ... are extremely low.

Figure 11:
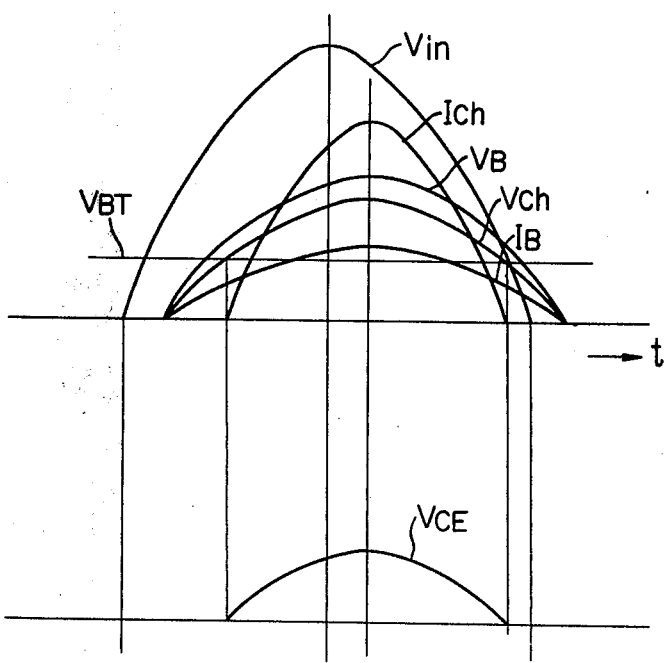
FIG. 11 is a diagram illustrating the operation thereof.

FIG. 11 shows a characteristic of the transistors $TR_{10}$, $TR_{11}$, ... in the embodiment shown in FIG. 10, and the reference letters shown herein correspond to those in FIG. 9.

As illustrated in FIG. 11, both output voltage of the control converter circuit 21 or a base voltage $V_B$ of the transistors $TR_{10}$, $TR_{11}$, ... and output voltage of the current supplying converter 20 or collector voltage $V_{ch}$ of the transistors $TR_{10}$, $TR_{11}$, ... are generated with a phase difference corresponding to a delay time against the voltage of the external a-c power supply $V_{in}$. Thus, a base current $I_B$ and collector current $I_{ch}$ have such characteristics as shown in FIG. 11, respectively. That is, the base current $I_B$ and collector current $I_{ch}$ are synchronized and thereby a collector-emitter voltage $V_{CE}$ has such characteristic as shown in FIG. 11. Thus, a collector loss (or $I_{ch} \times V_{CE}$) is very low compared with that of embodiment shown in FIG. 8, and respective transistors $TR_{10}$, $TR_{11}$, ... suffice with transistors having a extremely small capacity.

Also in an embodiment shown in FIG. 10, it is apparent that a peak value of an excessive current is sufficiently restricted by the transistors $TR_{10}$, $TR_{11}$, ... connected in parallel when the excessive current flows due to circuit troubles or other reasons.

FIG. 12 shows one embodiment of control circuit 8 in each of embodiments shown in FIGS. 1, 6, 7, 8 and 10 and FIG. 13 shows a control characteristic in said control circuit 8.

In this embodiment, the control circuit 8, as illustrated in FIG. 13, is controlled such that a charging is made to a battery with an extremely slight current when a battery terminal voltage V is not reached to a first desired level $V_1$, and controlled such that a charging current against the battery is kept in a constant current state until the terminal voltage of the battery V reaches from said first desired level $V_1$ to the second desired level $V_2$, and when the terminal voltage of the battery V reaches said second desired level $V_2$, controlled such that the battery terminal voltage is kept in a constant level. By providing said characteristics of current and voltage, a charging for the battery is made in a slight current when the battery terminal voltage is extremely low, and a breakage of the battery and circuit elements due to excessive current is prevented. And as to a battery having a voltage over terminal voltage $V_1$, at the starting of charging, it is charged with a high current, and at the end of charging, a control over constant voltage may be made so as not to become an excessive current state.

In FIG. 12, resistors $R_{27}$, $R_{28}$ and $R_{29}$ and transistor $TR_7$ form a battery voltage detecting means of the present invention, and the remaining reference letters indicate those corresponding to the reference letters shown in FIG. 2.

The collector of the transistor $TR_7$ is connected to a division point C between said resisters $R_{21}$ and $R_{22}$, and the emitter thereof is connected to the terminal 17' (having same potential as that of terminal 18') via resistor $R_{29}$. The resistor $R_{29}$ forms a parallel circuit to said resistor $R_{22}$ via transistor $TR_7$ and a voltage at said division point C may be defined by a switching operation of the transistor $TR_7$. The voltage determined at a division point C defines both a charging current level $I_1$ in a section lower than the predetermined first voltage level $V_1$ shown in FIG. 13 and a charging current 1-vel $I_2$ in a section from said first voltage level $V_1$ to the second voltage level $V_2$. The embodiment of the present invention is such that a charging for the battery in each of the sections is made in accordance with two current levels defined. That is, when the battery terminal voltage is in a section to reach the first voltage level $V_1$, the transistor $TR_7$ is turned off due to low value in the base potential thereof and thus one of the resistor $R_{29}$ of the parallel circuit comprised of said resistors $R_{22}$ and $R_{29}$ is excluded to leave the resistor $R_{22}$ and thus the voltage at a division point C is defined by said resistors $R_{21}$ and $R_{22}$. The voltage at said division point C is increased compared with a case in which the transistor $TR_7$ is kept to be on state. As a result of this the transistor $TR_5$ is controlled such that it is turned on due to above mentioned raise up of the voltage at the devision point C and the charging is begun at a low level in accordance with such characteristics as a shown in FIG. 13. And when the battery terminal voltage is in the range of first voltage level $V_1$ to the second voltage level $V_2$, the transistor $TR_7$ is perfectly turned on due to the fact that the base current of the transistor $TR_7$ is increased. Thus a parallel circuit consisting of the resistors $R_{22}$ and $R_{29}$ is formed and the voltage at the division point C is defined by parallel resistors $R_{22}$ and $R_{29}$ with the resistor $R_{21}$. And thus the voltage at the division point C is decreased compared with the state in which the transistor $TR_7$ is turned off. As a result of this decrease, a control over the transistor $TR_7$ is made such that the decrease in voltage causes the transistor $TR_7$ to turn off, and is changed to a constant current control as at $I_2$ shown in FIG. 13.

On the other hand, when the battery terminal voltage is over the second voltage level $V_2$, it may become possible to provide a control by the voltage signal applied between the terminals 18 and 18' to cause a constant voltage control.

And the characteristics will be changed to such conditions as shown in FIG. 13 by dotted line b when a thyristor is used instead of transistor $TR_7$.

What is claimed is:

1. A direct current power supply device for rectifying an a-c voltage of external power supply and supplying d-c power to a battery and/or a d-c load characterized in that it comprises:

a current detecting means to detect a current component flowing to said battery, a voltage detecting means to detect a terminal voltage of said battery, a control means controlled by said current detecting means and said voltage detecting means, a leakage transformer functioning by external a-c power supply, and a charging converter means for supplying d-c power to said battery, said charging converter means being controlled by said control means and supplied power from the output of said leakage transformer, said control means comprising a maximum value detecting circuit to combine the output voltage of said current detecting means and said voltage detecting means, a switching circuit controlled by said maximum value detecting circuit, a pulse generating circuit in which pulse rise time is controlled by said switching circuit, and a switching control circuit controlled by said pulse generating circuit, whereby said direct current power supply device is provided a determined current-voltage characteristic, said characteristic being such that a constant current state is kept until a terminal voltage of said battery reaches a desired level and a constant voltage state is kept when the terminal voltage of said battery reaches said desired level, said control means further including an excessive input voltage detecting means for detecting the output voltage of said external a-c power supply, said excessive input voltage detecting means controlling said switching control circuit decreasing the output power of said charging converter means when the output voltage of said external a-c power supply is high, said excessive input voltage detecting means comprises circuit elements having non-linear voltage and current characteristics comprising a voltage divider and Zener diode having one end thereof connected to a division point of said voltage divider and the other end thereof connected to said switching circuit, a d-c voltage having a value proportional to the output voltage of said external a-c power supply is applied to both ends of said voltage divider.

2. A direct current power supply device as set forth in claim 1 characterized in that a current flowing in said charging converter means is decreased when the output voltage of said a-c power supply is high.

3. A direct current power supply device for rectifying an a-c voltage of external power supply and supplying d-c power to a battery and/or a d-c load characterized in that it comprises:
   a current detecting means to detect a current component flowing to said battery,
   a voltage detecting means to detect a terminal voltage of said battery,
   a control means controlled by said current detecting means and said voltage detecting means,
   a leakage transformer functioning by external a-c power supply, and
   a charging converter means for supplying d-c power to said battery,
   said charging converter means being controlled by said control means and supplied power from the output of said leakage transformer,
   said control means comprising a maximum value detecting circuit to combine the output voltage of said current detecting means and said voltage detecting means, a switching circuit controlled by said maximum value detecting circuit, a pulse generating circuit in which pulse rise time is controlled by said switching circuit, and a switching control circuit controlled by said pulse generating circuit,
   whereby said direct current power supply device is provided a predetermined current-voltage characteristic, said characteristic being such that a constant current state is kept until a terminal voltage of said battery reaches a desired level and a constant voltage state is kept when the terminal voltage of said battery reaches said desired level, and a compensation means provided to generate an output signal compensated in response to a change in the atmosphere temperature and decrease a level of said current and voltage characteristics when the atmosphere temperature is increased.

4. A direct current power supply device as set forth in claim 3 characterized in that said compensation means increases the current flowing in said maximum value detecting circuit in response to a rise of atmosphere temperature, and changes the output signal of said maximum value detecting circuit.

5. A direct current power supply device as set forth in claim 4 characterized in that said compensation means comprises a load resistor connected to an output side of said current detecting means and a negative characteristic thermistor having one end thereof connected to an intermediate point of said load resistor and the other end connected to said maximum value detecting circuit.

6. A direct current power supply device as set forth in claim 3 characterized in that the compensation means increases a voltage applied to said maximum value detecting circuit in response to an increase in the atmosphere temperature.

7. A direct current power supply device as set forth in claim 6 characterized in that said compensation means comprises a voltage divider having a thermistor, both ends of said voltage divider being connected to said voltage detecting means and a division point of said voltage divider being connected to said maximum value detecting circuit.

8. A direct current power supply device for rectifying an a-c voltage of external power supply and supplying d-c power to a battery and/or a d-c load characterized in that it comprises:
   a current detecting means to detect a current component flowing to said battery,
   a voltage detecting means to detect a terminal voltage of said battery,
   a control means controlled by said current detecting means and said voltage detecting means,
   a leakage transformer functioning by external a-c power supply, and
   a charging converter means for supplying d-c power to said battery,
   said charging converter means being controlled by said control means and supplied power from the output of said leakage transformer,
   said control means comprising a maximum value detecting circuit to combine the output voltage of said current detecting means and said voltage detecting means, a switching circuit controlled by said maximum value detecting circuit, a pulse generating circuit in which pulse rise time is controlled by said switching circuit, and a switching control circuit controlled by said pulse generating circuit,
   whereby said direct current power supply device is provided with a predetermined current-voltage characteristic, and wherein, said charging converter means comprises a current supplying converter circuit to supply a current to said battery, a charging current control circuit provided between said current supplying converter circuit and said battery to control a charging current to said battery, and a control converter circuit to supply a control current to said charging current control circuit, said charging current control circuit comprising transistors connected in parallel.

9. A direct current power supply device as set forth in claim 8 characterized in that said control converter circuit comprises a thyristor.

10. A direct current power supply device as set forth in claim 8 characterized in that an input voltage for said current supplying converter circuit and said control converter circuit is applied from the same secondary winding of said leakage transformer.

11. A direct current power supply device as set forth in claim 10 characterized in that an output voltage of said current supplying converter circuit is set at a smaller value than an output voltage of said control converter circuit to utilize a saturated region of said transistors.

12. A direct current power supply device as set forth in claim 8 a battery wherein voltage detecting means to detect a terminal voltage of said battery and control said switching control circuit is provided to decrease an output power for said battery until the terminal voltage of said battery reaches a predetermined voltage level.

13. A direct current power supply device as set forth in claim 12 characterized in that said battery voltage detecting means is comprised such that it controls a signal voltage to said switching circuit.

14. A direct current power supply device as set forth in claim 13 characterized in that said battery voltage detecting means comprises a transistor.

* * * * *